Aug. 14, 1956   C. A. REHBEIN   2,758,885
CIRCULATION OF FLUIDIZED SOLIDS
Filed Nov. 25, 1952
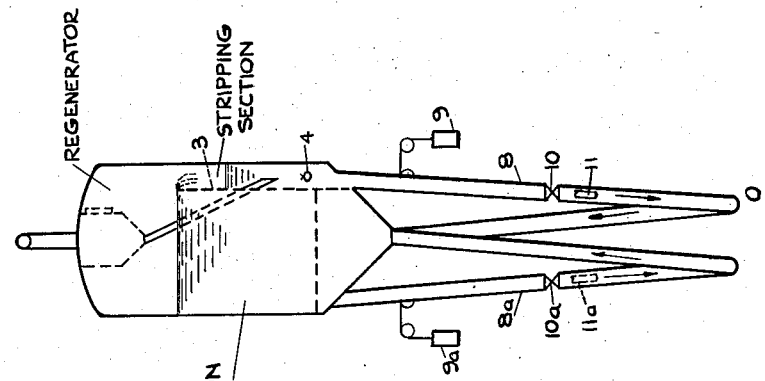
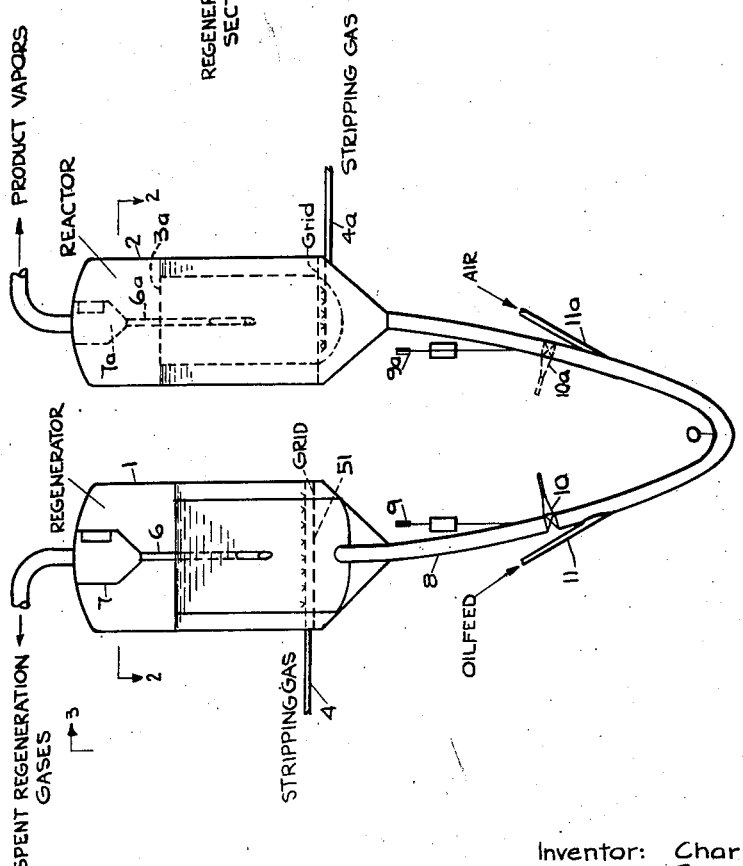
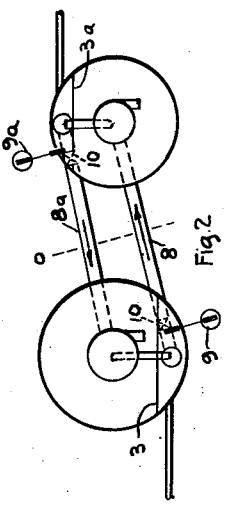
Inventor: Charles A. Rehbein
By: C. J. Ott
His Attorney › # United States Patent Office 2,758,885
Patented Aug. 14, 1956

2,758,885

CIRCULATION OF FLUIDIZED SOLIDS

Charles A. Rehbein, University Heights N. Y., assignor to Shell Development Company, Emeryville, Calif., a corporation of Delaware Application November 25, 1952, Serial No. 322,487

5 Claims. (Cl. 302—66)

This invention relates to an improvement in the circulation of particulate solids between vessels through the combined use of a hydrostatic head of the solid in a fluidized, i. e., pseudo liquid state, and gaseous fluids under pressure.

The circulation of particulate solids between separate vessels through the combined use of hydrostatic head of the solid in a fluidized state and gaseous fluid under pressure is required in many processes and technical operations. Its widest and most well known application is in the so-called fluidized catalyst catalytic cracking process. In fact, it is essentially the heart of this important process. The purpose of circulating a particulate solid between two vessels is to allow the solid to be contacted with different fluid media under chosen conditions. In the mentioned case of catalytic cracking, the particulate solid is the cracking catalyst and it is desired to contact it in one vessel with the oil to be cracked and in a separate vessel with air or oxygen to remove carbonaceous deposits. While many modifications of the fluidized catalyst catalytic cracking process have been suggested, some of which offer some improvement in the physical recirculation aspect of the process, it is surprising that very little fundamental work appears to be directed to this most basic feature of the process. In spite of the wide use of fluidized catalyst in catalytic cracking and the large number of designs suggested to improve other features, the known designs show an almost religious adherence to certain concepts which, upon examination, are found to be based upon lack of fundamental knowledge and reliance upon preconceived notions about how such systems might be expected to operate. Much of this can be traced to the original concept that a particulate solid in so-called fluidized condition behaves in many respects as a true liquid, i. e., it exhibits a hydrostatic head; it can be pumped, poured, etc.

As a consequence of preconceived notions and the existence of very limited fundamental knowledge during the birth and rapid growth of the fluidized catalyst catalytic cracking process, certain rules have been almost religiously followed. One of these rules is, for example, that in order to obtain the maximum hydrostatic head with the least difference in elevation, a standpipe should be applied and it should be positioned as near as possible to the vertical and have preferably no bends. Another (based upon the known fact that transportation of solids through a horizontal conduit is notoriously bad) is that when transporting the particulate solids from the bottom of the standpipe, the horizontal distance should be as small as possible and the conduit should therefore rise as steeply as possible, preferably vertically. The culmination of the application of these principles is in the most modern fluidized catalyst catalytic cracking plants known as the Uniflow system and the Orthoflow system. In these systems the vessels are positioned one directly above the other so that flow in one direction can be made approximately straight and vertical and the return flow can be made nearly so. While much can be said in favor of such systems for small plants, it is, nevertheless, true that in order to incorporate such systems in an actual plant, a very tall, spire-like structure must result. This has many practical and economical disadvantages compared to a plant in which the vessels are positioned side by side at a low elevation.

While the arrangements in the used and suggested alternative systems have been based primarily upon prevalent ideas regarding how fluidized systems should be expected to operate, it is also true that these systems have been influenced to a large extent by certain practical considerations. Thus, the concept of straight downward flow affording maximum static head fits well with the known fact that a vertical straight conduit is the least costly to build. This construction is chosen in the mistaken belief or assumption that the structure of the remaining part of the flow system is of secondary significance. Whether hitherto appreciated or not the systems hitherto used are deficient in one of the most fundamental aspects of the process; namely, the physical aspects of the recirculation of catalyst against a positive head by means of a combination of static head and transport medium. My invention is directed to improving this fundamental feature by the application of principles and findings which are contrary to the generally accepted concepts. The system and mode of operation of my invention are based partially upon observations of the shortcomings in plants of modern design, partly upon basic engineering principles, and partly upon an enlightened understanding of certain features of the flow of particulate solids in conduits obtained by experimental investigation.

Fundamentally, the problem is to continually transport a particulate solid, e. g., powdered cracking catalyst, from a fluidized bed in a first or supply vessel through a conduit at a rate which can be regulated into a second or receiver vessel horizontally displaced from the first vessel. As thus simply stated, no difficult problem is involved; however, when it is desired to recirculate the solid through two vessels, the second vessel becomes likewise a supply vessel and the first vessel likewise becomes a receiver vessel. This then presents a system which normally tends to be static and in which the desired circulation can only be obtained by artificially creating pressure differences. The size of these pressure differences is severely limited in practice by the limited maximum density of the fluidized material and the limited velocities which can be applied without destroying the equipment by "sand blasting." The process of my invention is primarily directed to improving the efficiency in creating and utilizing the necessarily small pressure differences. It also, however, affords distinct advantages from the standpoint of plant costs and maintenance.

In the method of operation according to my invention the small head required to make circulation possible is created by flowing the particulate solid from the first vessel A, e. g., a catalytic cracking reactor, in the so-called dense or peudo liquid phase in a conduit to a control valve at a low level, as hitherto practiced, but I impart to the downward moving mass a gradually accelerated horizontal velocity. I inject a gaseous fluid into the flowing mass after it passes through the control valve to thereby decrease its density and transport it to the second vessel, e. g., a catalytic cracking regenerator. However, I inject the gaseous fluid transport medium in such a manner that the flow of the mixture is retained in a generally downward direction. I then gradually accelerate the mixture in an upward direction. The reverse flow from the second vessel back to the first to complete the cycle is carried out in the same manner.

The desired combination of acceleration and direction can be qualitatively achieved by forming the conduit in any one of a number of curves having a radius of curvature which decreases to a minimum upon approaching the apex. The parabola is an ideal form. The Cartesian equation of the parabola is $X^2 = 2py$, where $p$ is the distance and direction from the directrix to the focus.

In any case, the control valve is placed on the downflow or inlet side of the curved path above the apex. When the conduit connecting the two vessels is in the form of a parabola, the dense phase material leaving the supply vessel descends the conduit by gravity but, in so doing, it is subjected to a gradually increased acceleration in a horizontal direction. This acceleration must be gradual in order to avoid loss of static head. Thus, in the general equation designating the shape of a parabola, $p$ should be chosen such that it is not greater than $x$ when $x$ is the horizontal distance between the ends of the conduit. The flow should be as far as possible in one plane.

A gaseous fluid transport medium such as air, hydrocarbon vapor, or the like, is injected into the conduit just below the control valve. The stream of solid passing through the control valve is, therefore, diluted with the injected gaseous medium and the linear velocity of the solid is greatly accelerated. This acceleration is enhanced by the generally downward direction of the flow at this point. For various practical reasons, the linear velocity of the stream should not be caused to exceed about 60 feet/second. The horizontal component of the speed is gradually accelerated with gradual deceleration of the vertical component until the vertex of the curved path is reached, after which the vertical component is accelerated at the expense of the horizontal component.

By flowing the solid in the path indicated, the desired circulation can be obtained with small differences in elevation between the level in the supply vessel and the level at the control valve. The more or less localized zone of fluctuating high pressure, which is normally present at the exit of the control valve, is avoided. This high pressure zone which is present in the conventional designs is caused by the compressive or restrictive effect of the large amount of work required to rapidly accelerate the large amount of solid at this point. In the method of my invention, the solid is first accelerated with little expenditure of energy and the change in direction is then effected most gradually upon the accelerated mass. Consequently, the flow may be controlled with less danger of "blow back" with a very low pressure drop across the control valve. As stated above, the return flow is effected in the same manner to complete the cycle.

The fact that there is a return flow to complete the cycle is important in that it introduces the condition that in the overall system gavity flow is cancelled and the desired flows must therefore be effected by the artificially produced pressure differences which the present invention most effectively utilizes. In circulation between two vessels any advantage obtained in transporting solid from a first vessel having a higher level of solid to a second vessel having a lower level of solid is offset by increased back pressure on the return flow of the cycle. It is in such systems (the levels of solids in the two vessels, i. e., the elevation of the top surfaces of the fluidized beds, may be the same or different) that the method of the invention is advantageous.

The method is particularly advantageous in such systems where the level of solid on the discharge side of each flow is above the level of fluid on the supply side. In such cases, both the forward and return flows are used to elevate the solid and it is under such conditions that the efficient utilization of the artificially induced heads is of greatest importance.

In the method just described, solid is caused to flow from one vessel to the other in a parabolic path through the vertex of a parabola with the control valve and gaseous fluid injection located up stream of the vertex. This system not only has the advantages mentioned above but also has practical advantages from the cost and construction standpoint. It may be noted that the parabolic path described is substantially identical for practical purposes to the common catenary. The parabola and the common catenary are so similar in the region of their vertexes that it was believed at one time that the common catenary was in fact a parabola. Since the catenary is the ideal shape of the transfer conduit from the standpoint of ease of suspension and minimum stress in the line, I, for these reasons, prefer to actually construct the conduit in the form of a common catenary. This deviation from the true parabola is too slight to modify the improved flow characteristics discussed above. The Cartesian equation for the common catenary is $$y = \frac{a}{2}\left(e^{\frac{x}{a}} + e^{-\frac{x}{a}}\right)$$

In this equation "$a$" is the usual constant which depends upon the horizontal distance between the ends of the conduit, the weight of the loaded conduit, and the vertical difference in elevation between the mid height of the ends of the conduit and the center of the conduit. The constant "$a$" can be calculated for any given case by dividing the horizontal tension by the weight of a unit length of the loaded conduit.

In constructing the conduit in the form of a catenary, the somewhat greater density caused by the fluidized solid above the control valve may be taken into consideration; however, in such cases where this correction may cause an appreciable deviation from the desired parabolic shape, it is preferred to cancel this difference in density by the use of one or more counter-weights on this part of the conduit. However, it is often not necessary to revert to this expedient since the required diameter in that section of the conduit above the control valve may be less than that of the remainder of the conduit and, as a result, the weight per unit length of loaded conduit may not vary appreciably in the two sections.

The method and apparatus of my invention are illustrated in the accompanying drawing wherein Figure I is a diagrammatic illustration of the important parts of a catalytic cracking system embodying the invention, and Figure II is a plan view of the plant illustrated in Figure I. Figure III is a profile of the same plant.

Referring to the drawing, the main two vessels are the regenerator 1 and the reactor 2. In the case illustrated, these vessels are of similar design and construction and are supported at equal elevations by means which are not shown. It is to be understood, however, that these vessels may be at different elevations and may differ as to their internal arrangements. In the case illustrated, each vessel is provided with a vertical partition 3 and 3A which divides the horizontal cross-section of the vessel into two parts, the smaller of which constitutes a stripping section. Suitable gases for stripping the powdered cracking catalyst are introduced through lines 4 and 4A, each line being provided with suitable means for distributing the gases over the cross-section of the stripping section. Each vessel is also provided with a grid 5 or equivalent means for distributing the incoming vapors and powdered catalyst over the cross-section of the main section, i. e., regeneration or reaction section. The flow is out of the stripping section and into the main section in each case. The levels of the fluidized solid in the main sections are fixed by the tops of the mentioned partitions which act as wiers. The level of the fluidized solid in the stripping section is in each case below the top of the partition. In each case, i. e., in both directions of flow, it is necessary to raise the solid catalyst from the lower level in the stripper to the higher level in the main section of the vessel. The difference in height H may be, for example, 10 feet in each case. This reversed head or back pressure could be easily eliminated by maintaining the levels in the main section and stripping section equal, thereby lessening the circulation problem. However, the arrangement shown wherein the level in the stripping section is in each case held below the level in the main section, is so advantageous in other respects that it is by far the most practical arrangement in spite of the difficult recirculation problem which is created. By maintaining the level in the stripping section well below that in the main section in each vessel, the return lines or dip legs 6 and 6A of the cyclone separators 7 and 7A can be directed into the stripping section and the size of the vessels may thereby be greatly decreased; or with a vessel of given size a throughput capacity may be increased by operating the vessel at a much higher catalyst level.

In the system illustrated, the desired circulation is effected by means of the connecting conduits 8 and 8A which are in the shape of a common catenary having its vertex at 0. As pointed out above, the shape of the conduit is for all practical purposes a parabola. The somewhat greater densities on the upflow sides of the control valves are cancelled by the use of counter-weights 9 and 9A which are attached to the conduits by cables passing over pulleys.

The control of the flows in the conduits is effected by means of valves 10 and 10A which, as illustrated, are placed on the upstream side of the vertex of the path of flow. In the case illustrated the control valves are automatically regulated slide valves and are positioned in such a manner that the port opens upon pulling the slide upwardly, normal to the curve of the conduit. This is to take advantage of the fact that, due to the gradual horizontal acceleration being imparted to the solid mass as it moves down the conduit, there is a density gradient across the conduit normal to the curve. Since the valve is always at least partially open during operation, the more dense material is allowed to follow the smooth curve with no interference or obstruction. Immediately upon passing the control valve, the catalyst is diluted and accelerated by gaseous medium introduced by lines 11 and 11A. As illustrated, the flow is still downward at this point. The diluted mass at an accelerated velocity, for example 35 feet per second, then continues through the conduit and, due to the shape of the path, is gradually and smoothly accelerated upwards. Upon issuing from the end of the conduit, the mixture passes into a cone and grid into the bed of fluidized catalyst in the main section of its respective vessel. It will be noted that there is no distance of horizontal flow in the conduits 8 and 8A but that the solid flows continuously along a smooth path of continuously changing radius of curvature. During the first part of the flow, the radius of curvature is gradually shortened and, in the last part of the flow, the radius of curvature is again gradually lengthened.

I claim as my invention:

1. In the continuous controlled recirculation of a particulate solid through two horizontally displaced vessels interconnected by conduit means, said recirculation being obtained solely by the combined action of gravity head and gaseous transport medium, the improvement which comprises flowing the solid from one of said vessels to the other of said vessels through one of said conduits in a smooth curved path which is substantially that of a parabola, the vertex of said parabola being below and between said vessels, regulating the flow in said path at a point upstream of said vertex, and injecting gaseous transport medium immediately downstream of said point, likewise on the upstream side of said vertex, whereby the particulate solid is transferred from a dense phase immediately upstream of said flow-regulating point to a dilute phase immediately downstream of said flow-regulating point, and whereby the acceleration of the solid caused by injection of the transport medium is generally downward with little change in direction.

2. A system for the recirculation of a particulate solid through two vessels which comprises in combination two laterally displaced vessels A and B, each of which is provided with an inlet port and an outlet port near the bottom thereof, two conduits interconnecting said two vessels in such a manner that the first conduit interconnects the outlet port of vessel A with the inlet port of vessel B and the second conduit interconnects the outlet port of vessel B with the inlet port of vessel A, each of said conduits depending from the said ports in the form of a catenary, each of said conduits also being provided by a flow control means above the lowest extremity of the conduit and on the upstream side of said extremity, and each of said conduits being also provided with means for injecting a gaseous fluid transport medium in a generally downward direction at a point above the lowermost extremity of the conduit and on the upstream sides of said extremity and immediately downstream of said control means.

3. A system conforming to claim 2 further characterized in that each of said conduits is further provided with a suspended counterweight attached to each conduit at approximately the center of gravity of that section of each conduit between its inlet and its control valve.

4. The system according to claim 2 further characterized in that the said control means is a slide valve positioned on the top side of the conduit and arranged such that the movement of the slide is normal to the curve of the conduit and opens the valve by a generally upward motion of the slide.

5. In the continuous controlled recirculation of a particulate solid through two horizontally displaced vessels interconnected by conduit means, said recirculation being obtained solely by the combined action of gravity head and gaseous transport medium, the improvement which comprises flowing the solid from a first one of said vessels to the second one of said vessels through one of said conduits in a smooth curved path which is substantially that of a downwardly convex catenary, the lowest point thereof being below and between said vessels, regulating the flow in said path at a point upstream of said lowest point of the path, and injecting gaseous transport medium immediately downstream of said flow-regulating point, likewise on the upstream side of said lowest point of the path, whereby the particulate solid is transferred from a dense phase immediately upstream of said flow-regulating point to a dilute phase immediately downstream of said flow-regulating point, and whereby the acceleration of the solid caused by the injection of the transport medium is generally downward with little change in direction, and returning the particulate solid from said second vessel back to said first vessel through another of said conduits in the same manner.

References Cited in the file of this patent

UNITED STATES PATENTS

| | | |
|---|---|---|
| 2,311,564 | Munday | Feb. 16, 1943 |
| 2,375,057 | Weigand | May 1, 1945 |
| 2,420,129 | Flock | May 6, 1947 |
| 2,487,961 | Angell | Nov. 15, 1949 |
| 2,515,156 | Jahnig et al. | July 11, 1950 |
| 2,579,678 | Kuhn | Dec. 25, 1951 |
| 2,589,124 | Packie | Mar. 11, 1952 |
| 2,602,019 | Odell | July 1, 1952 |
| 2,610,901 | Cross | Sept. 16, 1952 |
| 2,643,161 | Shirk | June 23, 1953 |
| 2,700,641 | Rehbein | Jan. 25, 1955 |